D. B. NEAL
Grain-Drill.
No. 20,575.
Patented June 15, 1858.
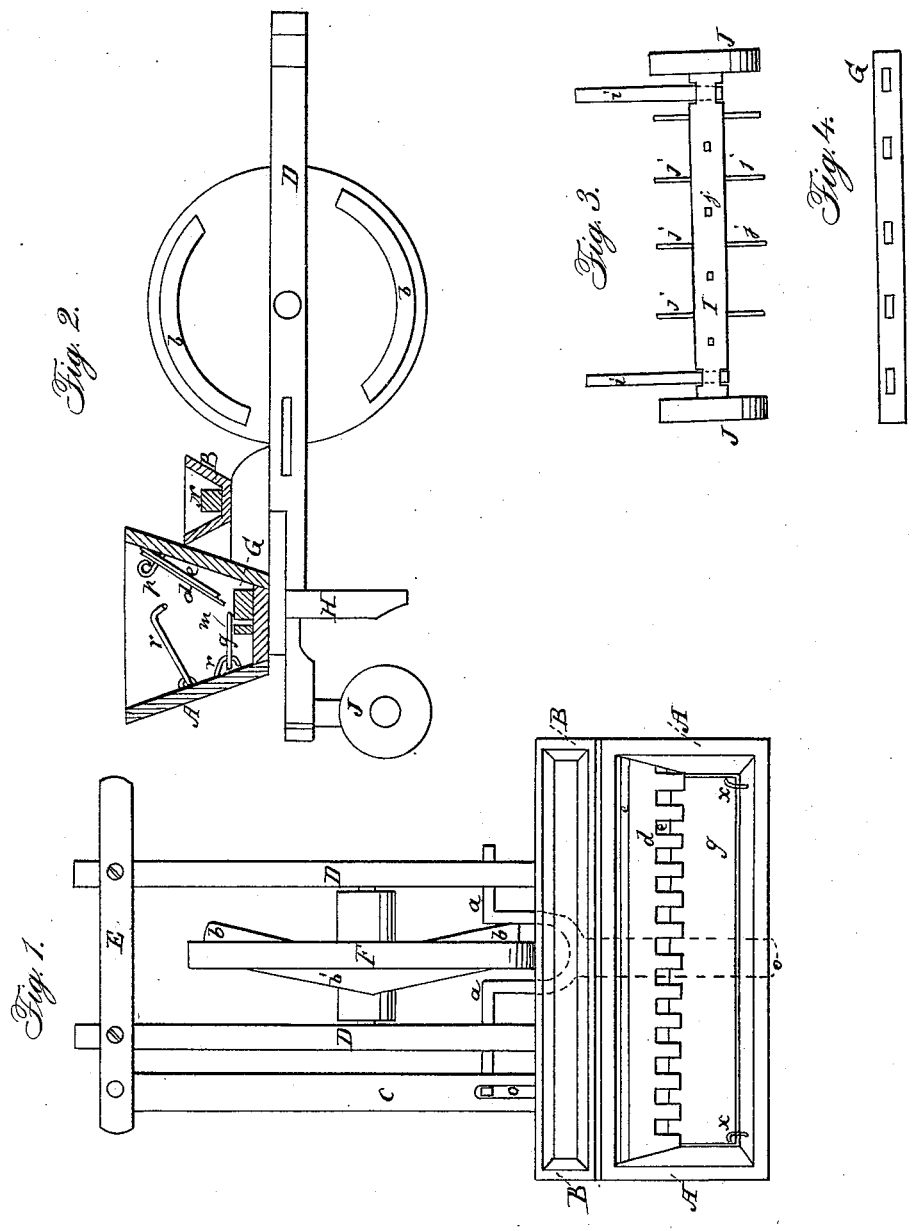

UNITED STATES PATENT OFFICE.

DANIEL B. NEAL, OF MOUNT GILEAD, OHIO.

IMPROVEMENT IN SEEDING-MACHINES.

Specification forming part of Letters Patent No. 20,575, dated June 15, 1858.

*To all whom it may concern:*

Be it known that I, DANIEL B. NEAL, of Mount Gilead, in the county of Morrow and State of Ohio, have invented certain new and useful Improvements in Seeding-Machines; and I do hereby declare that the following is a full, clear, and exact description of the same, reference being had to the accompanying drawings, and to the letters of reference marked thereon.

The nature of my invention consists in the peculiar arrangement of the several devices, which will be hereinafter mentioned and fully described.

In order that those skilled in the arts may use and manufacture my invention, I will proceed to describe its construction and operation.

In the annexed drawings, Figure 1 is a plan view. Fig. 2 is a side elevation. Fig. 3 is a view of the revolving clearer. Fig. 4 is a view of seed-slide G.

In Fig. 1, A and B represent two seed-boxes, which are intended for sowing different kinds of grain. Box A may be used for wheat, rye, oats, barley, or any such grain, and also for planting corn; while B is used for planting grass-seed or clover-seed at the same time that other seed is being sowed. D D represent a portion of the frame which extends out in front, E being a cross-piece connecting the bars D D, and to which the double-tree may be attached. F is the driving-wheel of the machine, said wheel having its bearings in the bars D D, and being provided with pieces in cam form, which are on the sides of said wheel, as seen at $b\ b$ and $b'$. C is a bar secured at one end to the cross-piece E by means of a pivot, on which it works. The other end, running back toward the seed-hoppers, passes under hopper B and into the seed-slide G of hopper A, and serves to operate it. The seed-slide of hopper B is connected with this bar C also, and is operated likewise by it. Bar C is provided with a slot, $o$, as seen toward its rear extremity. $a$ is a peculiar-shaped lever, secured by means of a pivot to the under side of the frame at a point under hopper A. One end of this forked lever turns out toward the bar C, and, entering the slot $o$, serves to operate it. When the machine is in motion and this lever is operated upon by the cams on the side of the wheel F, this lever $a$ being forked, and there being cams on both sides of the wheel for the purpose of operating it, it has a lateral vibratory motion, as will be clearly seen. This lever $a$, being pivoted at its rear extremity, is provided with graduated holes, so that it may be drawn back and stationed in such a manner that its front prongs will not be operated upon by the cams on wheel F, and thus the seeding apparatus of the machine will be stopped. $g$ is a door which forms a false bottom to the seed-box A, said door being hinged, as seen at $x\ x$. This door does not extend entirely across the bottom of the box A, but only to or near the slide G, Fig. 2. $e$ is a graduating-slide, which slides in grooves in the ends of the seed-box and serves to regulate the quantity of grain which passes to the seed-slide. $d$ is a screen which slides in the same groove with the slide $e$ and by its side, for the purpose of preventing straw or other material entering into the seed-slide and thus choking it. This slide $e$ and screen $d$ are stationed at any desired point by means of the pin $p$, (seen in Fig. 2,) which passes through them and into the side of the box A. The seed in box A passes through the center of the seed-slide through the apertures made in it, as seen in Fig. 4.

In Fig. 2, A and B are the seed-hoppers. $m$ is a small partition in box A, having apertures in its side at its bottom, through which seed may pass to the slide. G is the seed-slide of box A. $g$ is the false bottom. $e$ is the slide-gage. $d$ is the screen, and $p$ is the pin stationing them at any desired point. $r$ is a small rod, with a hook on the end of it. Said hook may enter the seed-slide G and operate as stirrers or shakers for the seed. This rod $a$ is secured at one end to one side of the seed-box. N is the seed-slide of hopper B. H is the discharge-spout, and J is one wheel of the revolving clearer.

Fig. 3 is the revolving clearer or clod-breaker. It consists of a cylinder, I, provided with teeth $j\ j\ j$ and wheels J J. It is secured to the machine by means of the pieces $i$. This clearer or clod-breaker may be secured in front or immediately beside the seed-spouts, and will then act as a clearer of straw, brush, or any other obstacles in their path; but when secured behind the discharge-spouts it acts for the purpose of breaking the clods that may fall upon the seed.

Two kinds of seed may be placed in the box

A. Large grains may be placed upon the bottom $g$, and small grain—such as grass and clover seed—may be placed under this bottom $g$, and will pass through the division $m$ and mix with and be discharged with the larger grain through the discharge-spouts.

In some instances it is very desirable to have two seed-boxes, arranged as I have them, for sowing two kinds of grain at the same time.

Having thus fully described my invention, what I claim as new, and desire to secure by Letters Patent, is—

The peculiar arrangement of the gage-slide $e$, the screen $d$, and the pin $p$ with the bottom $g$ and seed-slide G, for the purpose of regulating the quantity of seed to be discharged and at the same time preventing straw or chaff from choking the slides, as is herein fully set forth.

DANIEL B. NEAL.

Witnesses:
T. H. DALRYMPLE,
JOSEPH T. BEEBE.